(12) United States Patent
Kuo (10) Patent No.: US 10,728,191 B2
(45) Date of Patent: Jul. 28, 2020

(54) METHOD FOR ESTABLISHING COMMUNICATION WITHIN A CLOSED NETWORK

(71) Applicant: Teamplus Technology Inc., New Taipei (TW)

(72) Inventor: Cheng-Hsiang Kuo, New Taipei (TW)

(73) Assignee: Teamplus Technology Inc., New Taipei (TW)

( * ) Notice: Subject to any disclaimer, the term of this patent is extended or adjusted under 35 U.S.C. 154(b) by 0 days.

(21) Appl. No.: 16/360,891

(22) Filed: Mar. 21, 2019

(65) Prior Publication Data

US 2019/0297036 A1 Sep. 26, 2019

(30) Foreign Application Priority Data

Mar. 26, 2018 (TW) .............................. 107110195 A (51) Int. Cl.
*H04L 12/58* (2006.01)
*H04L 29/06* (2006.01)
*G06K 19/06* (2006.01)

(52) U.S. Cl.
CPC ...... *H04L 51/046* (2013.01); *G06K 19/06037* (2013.01); *H04L 51/38* (2013.01); *H04L 63/123* (2013.01); *H04L 63/126* (2013.01)

(58) Field of Classification Search
CPC ..... H04L 51/046; H04L 51/38; H04L 63/123; H04L 63/126; G06K 19/06037
See application file for complete search history.

(56) References Cited

U.S. PATENT DOCUMENTS

| | | | | |
|---|---|---|---|---|
| 9,807,123 | B2 * | 10/2017 | Hodge | H04L 51/38 |
| 10,067,772 | B1 * | 9/2018 | Ledet | H04L 51/046 |
| 2016/0285791 | A1 * | 9/2016 | Teng | H04L 51/04 |
| 2017/0310614 | A1 * | 10/2017 | Lin | H04L 51/04 |
| 2018/0210683 | A1 * | 7/2018 | Tan | H04L 51/046 |

* cited by examiner

*Primary Examiner* — Arvin Eskandarnia
(74) *Attorney, Agent, or Firm* — Michael Best & Friedrich LLP (57) ABSTRACT

A method for establishing communication includes: in receipt of identification information associated with an outside party from an inside party, transmitting, by a closed server, link information to an outside party device associated with the outside party via a public server; in receipt of a request from the outside party device executing an instant messaging application, transmitting, by the public server, an identifier associated with a communication group to the outside party device; and in receipt of the identifier, adding, by the closed server, the outside party to the communication group and enabling the outside party to communicate exclusively with the inside party via an instant messaging service.

8 Claims, 6 Drawing Sheets

METHOD FOR ESTABLISHING COMMUNICATION WITHIN A CLOSED NETWORK

CROSS-REFERENCE TO RELATED APPLICATION

This application claims priority of Taiwanese Patent Application No. 107110195, filed on Mar. 26, 2018.

FIELD

The disclosure relates to a method for establishing communication within a closed network, more particularly to a method for establishing communication within a closed network using an instant messaging service within the closed network.

BACKGROUND

Instant messaging services (IMS) have been widely used in daily lives. In Taiwan, it is found that on average, a person may spend over one hour using one or more IMS applications such as LINE®, WeChat®, Whatsapp®, etc.

In a closed network of, for example, an enterprise, an organization, a government body, etc., using an IMS application to communicate has become very common. In view of a higher security requirement for the closed network, an enterprise version of IMS application has been developed. Typically, the enterprise version of IMS application is exclusive for use by the members of a specific closed network. That is to say, non-members are not allowed to transmit data with the members using the enterprise version of IMS application.

SUMMARY

Therefore, an object of the disclosure is to provide a method for establishing communication within a closed network.

According to one embodiment of the disclosure, the method is implemented using a closed server cooperatively with a public server. The closed server is in communication with the public server and is installed with an instant messaging service system exclusive to a group of people. The instant messaging service system includes a communication group that includes at least one inside party within the group of people. The method includes:

receiving, by the closed server, identification information associated with an outside party not belonging to the group of people from a staff-end device that is in communication with the closed server and that is associated with the inside party;

transmitting, by the closed server, link information to an outside party device that is associated with the outside party via the public server, the link information including a link for downloading an instant messaging application;

in response to receipt of a registration request from the outside party device executing the instant messaging application, transmitting, by the public server, an identifier associated with the communication group to the outside party device; and in response to receipt of the identifier from the outside party device executing the instant messaging application, by the closed server, adding the outside party to the communication group and enabling the outside party to communicate exclusively with the inside party via the instant messaging service system.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
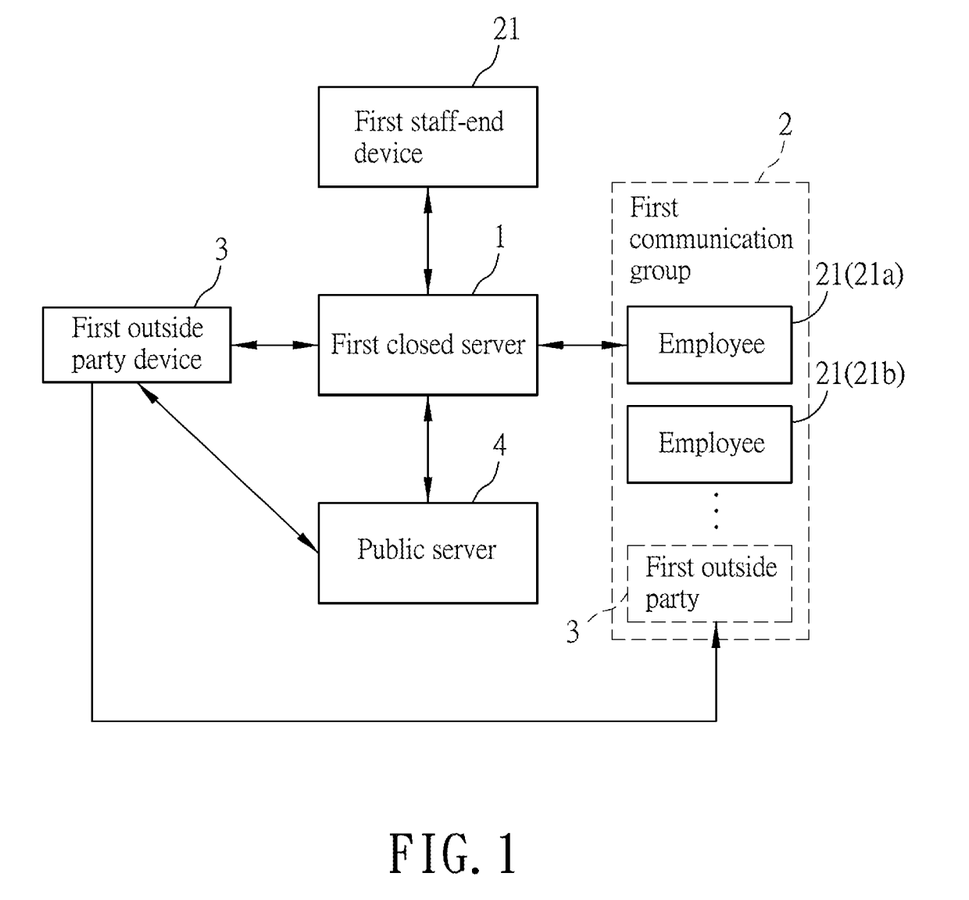
FIG. 1 is a block diagram illustrating a first closed server that is in communication with a public server according to one embodiment of the disclosure.

FIG. 1 is a block diagram illustrating a first closed server 1 that is in communication with a public server 4, according to one embodiment of the disclosure. The first closed server 1 is installed with a first instant messaging service (IMS) system exclusive to a first group of people, which may be members of an enterprise, a private organization, a government body, a political organization, etc. The first IMS system includes a first communication group 2 that includes at least one first inside party within the first group of people. In this embodiment, the first group of people may be members of a first enterprise, and the first inside parties in the first communication group 2 may be labeled as employee A, employee B, etc.

It is noted that in various embodiments, the first group of people may be grouped into additional communication groups each including different members, as indicated by FIG. 1.

Each of the first closed server 1 and the public server 4 may be embodied using a computer device that includes a communication component for communicating with other electronic devices, and a processor for performing specific operations.

For example, a processor may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

The communication component may include a short-range wireless communicating module supporting a short-range wireless communication network using a wireless technology of Bluetooth® and/or Wi-Fi, etc., and/or a mobile communicating module supporting telecommunication using Long-Term Evolution (LTE), the third generation (3G) and/or fourth generation (4G) of wireless mobile telecommunications technology, and/or the like.

It may be desired that an outside party, who does not belong to the first group of people (e.g., a representative from another enterprise), to communicate with the members in the first communication group 2. In that case, a method for establishing communication within a closed network may be carried out.

Figure 2:
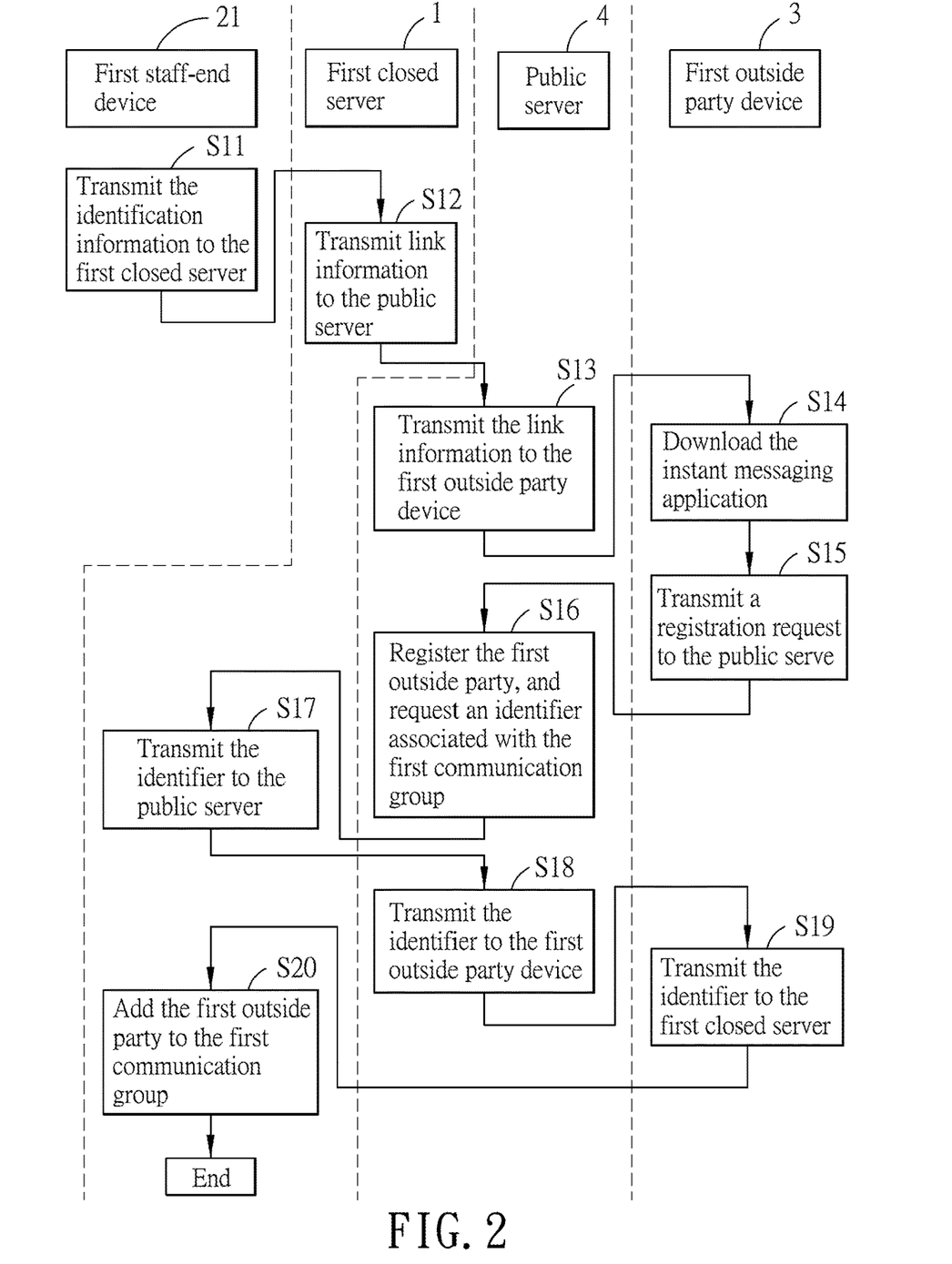
FIG. 2 is a flow chart illustrating steps of a method for establishing communication within a closed network according to one embodiment of the disclosure.

FIG. 2 is a flow chart illustrating steps of the method for establishing communication within a closed network, according to one embodiment of the disclosure.

In step S11, when it is desired that a first outside party is to be included in the first communication group 2, one of the first inside parties included in the first communication group 2 (e.g., the employee A) may operate a first staff-end device 21, that is installed with an instant messaging application to communicate with the first IMS system of the first closed server 1. Then, the employee A may input identification information associated with the first outside party in the first staff-end device 21, and use the first staff-end device 21 to transmit the identification information to the first closed server 1. In this embodiment, the first staff-end device 21 may be embodied using a personal computer (PC), a laptop, a tablet, a mobile device, a smartphone, etc.

In this embodiment, the identification information includes at least one of a telephone number or an email address associated with the first outside party.

In response to the identification information, in step S12, the first closed server 1 compiles and transmits link information to the public server 4. In this embodiment, the link information includes a link for downloading the instant messaging application. In some embodiments, the first closed server 1 further transmits the identification information to the public server 4.

In step S13, the public server 4 transmits the link information to a first outside party device 3 that is associated with the first outside party according to the identification information. In this embodiment, the first outside party device 3 may be embodied using a personal computer (PC), a laptop, a tablet, a mobile device, a smartphone, etc.

In some embodiments, the link information may be transmitted to the email address associated with the first outside party.

In step S14, the first outside party operates the first outside party device 3 to download the instant messaging application using the link information. Then, the first outside party operates the first outside party device 3 to install the instant messaging application.

In step S15, the first outside party, using the first outside party device 3 executing the instant messaging application, communicates with the public server 4 and transmits a registration request to the public server 4. It is noted that the registration request includes the content that is included in the identification information. For example, the first outside party may be instructed to enter his/her telephone number or email address in the registration request.

In response, in step S16, after determining that the content included in the registration request conforms with the content in the identification information (e.g., the telephone numbers or email addresses are identical) the public server 4 registers the first outside party, and requests an identifier associated with the first communication group 2 from the first closed server 1 after the registration of the first outside party is completed. In some embodiments, the public server 4 determines whether the content of the registration request conforms with the identification information, and then completes the registration of the first outside party only when it is determined that content of the registration request conforms with the identification information. Otherwise, the method is terminated since the content of the registration request does not conform with the identification information.

In step S17, the first closed server 1 transmits the identifier associated with the first communication group 2 to the public server 4 in response to the request from the public server 4.

In response to receipt of the identifier, in step S18, the public server 4 transmits the identifier to the first outside party device 3. In this embodiment, the identifier may be a string containing numbers, alphabets and/or symbols.

In step S19, the first outside party operates the first outside party device 3 executing the instant messaging application to input the identifier and to transmit the identifier to the first closed server 1. In response, in step S20, the first closed server 1 proceeds to add the first outside party to the first communication group 2 corresponding to the identifier received from the first outside party device 3. As a result, the first outside party is enabled to communicate exclusively with the first inside parties within the first communication group 2 via the first IMS system. It is noted that, since the first outside party is recognized as an entity outside of the first group of people, when another outside party is also added to the first communication group 2, he/she cannot communicate with the first outside party using the first IMS system. Moreover, the first outside party is not allowed to communicate with members of all other communication groups associated with the first group of people.

In brief, the method as described above provides a way to allow an outside party, who does not belong to the first group of people, to communicate with a selected subset of the first group of people (i.e., those included in the first communication group 2) within the closed network.

Figure 3:
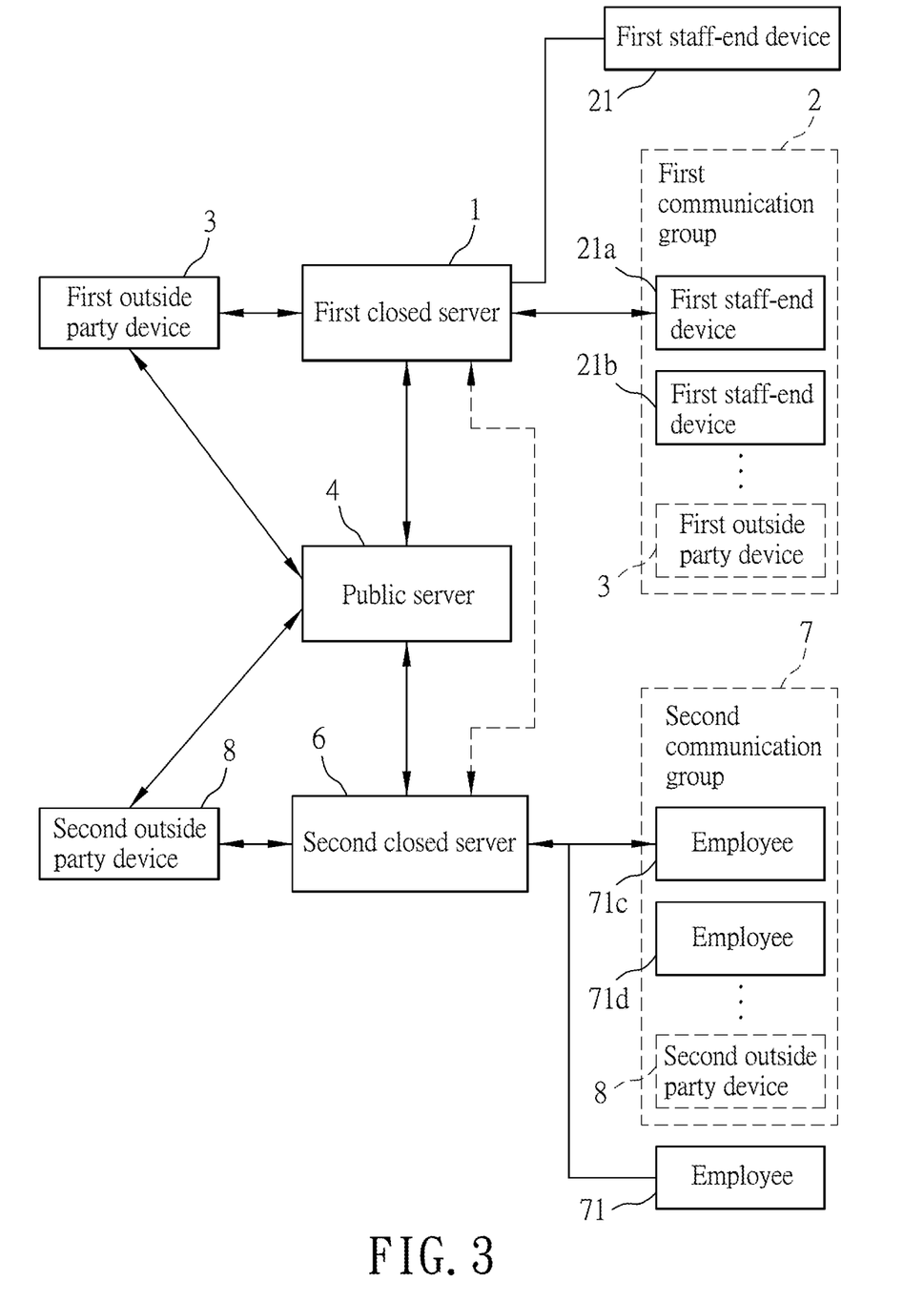
FIG. 3 is a block diagram illustrating two closed servers, each being associated with a group of people according to one embodiment of the disclosure.

FIG. 3 is a block diagram illustrating another scenario that involves two closed servers, each being associated with a group of people, according to one embodiment of the disclosure.

Specifically, in this embodiment, a second closed server 6 is further involved and is also capable of communicating with the public server 4. It is noted that the second closed server 6 may be configured to have a physical structure similar to that of the first closed server 1, and is capable of performing similar operations.

Additionally, the second closed server 6 is installed with a second instant messaging service (IMS) system exclusive to a second group of people (e.g., a second enterprise different from the first enterprise). The second IMS system may be one that is the same as the first IMS system, and includes a second communication group 7 that includes at least a second inside party belonging to the second group of people (e.g., employee C and employee D) and a second outside party not belonging to the second group of people. It is noted that the second outside party has been added to the second communication group 7, for example, in a manner similar to that illustrated in FIG. 2, and the second outside party is limited to communicating only within the second communication group 7.

When it is desired that the first outside party and the second outside party communicate using the first and second IMS systems, a method for establishing communication between the first outside party and the second outside party within a closed network may be carried out.

Figure 4:
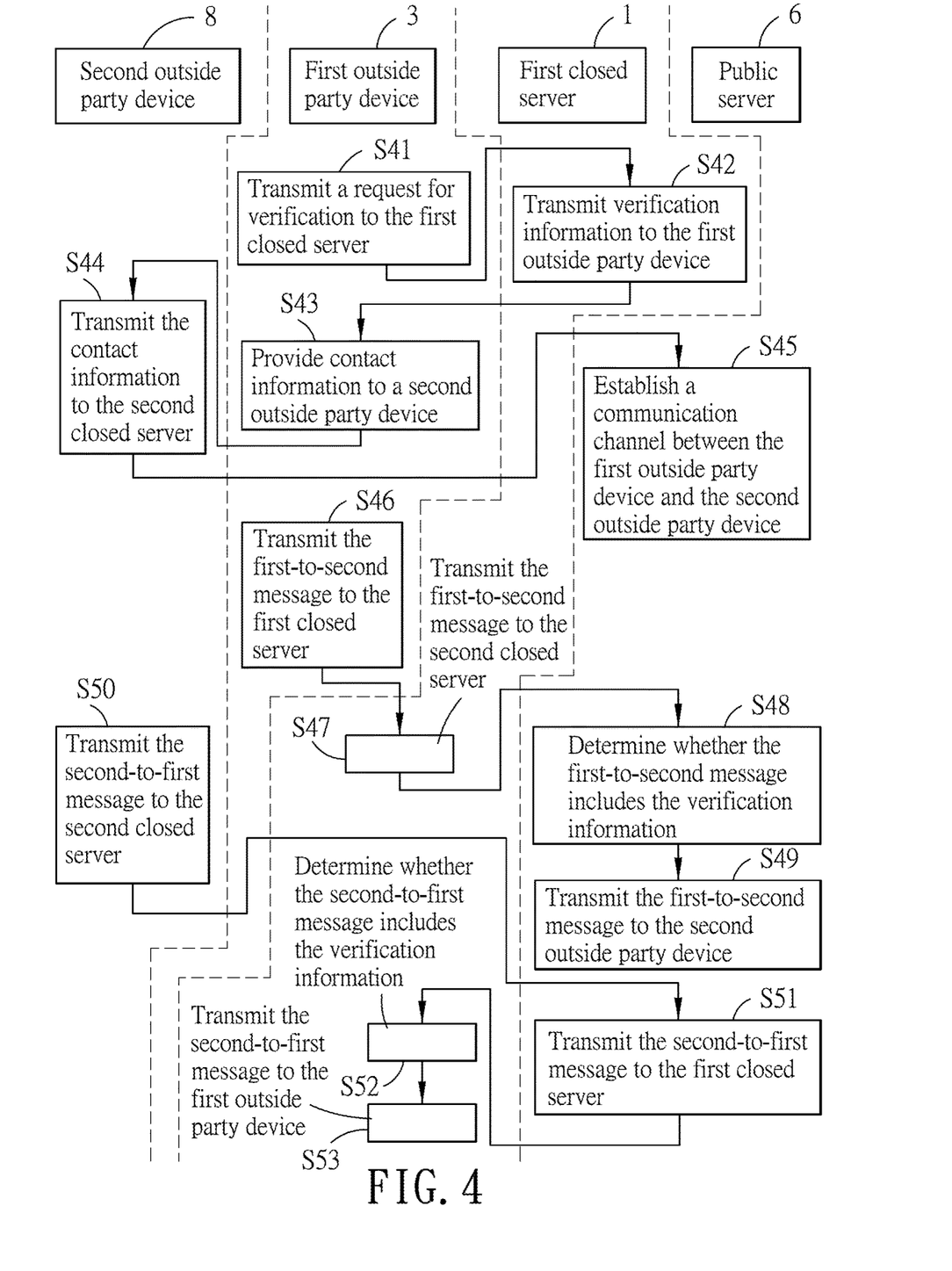
FIG. 4 is a flow chart illustrating a method for establishing communication within a closed network to be implemented using the first closed server cooperatively with the public server and the second closed server according to one embodiment of the disclosure.

FIG. 4 is a flow chart illustrating the method for establishing communication between the first outside party and the second outside party within a closed network, and the method of FIG. 4 is to be implemented using the first closed server 1 cooperatively with the second closed server 6, according to one embodiment of the disclosure.

In step S41, upon the first outside party operating the first outside party device 3, the first outside party device 3 transmits a request for verification to the first closed server 1. In response to receipt of the request for verification from the first outside party device 3, in step S42, the first closed server 1 transmits verification information to the first outside party device 3. In this embodiment, the verification information may include a string of characters/symbols that is sent via a short message service (SMS) message, an email address, etc.

In step S43, upon the first outside party operating the first outside party device 3, the first outside party device 3 provides contact information to a second outside party device 8 that is associated with the second outside party. In this embodiment, the second outside party device 8 may be embodied using a personal computer (PC), a laptop, a tablet, a mobile device, a smartphone, etc.

The contact information may include the identification information, the verification information, and connection information associated with the first closed server 1 (e.g., an address of the first closed server 1).

It is noted that in some embodiments, the contact information is encoded in a quick response (QR) code, is displayed by a display of the first outside party device 3, and is scanned by an image capturing component (e.g., a camera) included in the second outside party device 8. The second outside party device 8 may include a processor to decode the QR code scanned by the image capturing component so as to obtain the contact information encoded in the QR code.

Subsequently, in step S44, upon the second outside party operating the second outside party device 8, the second outside party device 8 stores the identification information and the verification information, and transmits the contact information to the second closed server 6.

In step S45, in response to receipt of the contact information, the second closed server 6 communicates with the first closed server 1 based on the connection information (address) of the first closed server 1, and then, establishes a communication channel between the first outside party device 3 and the second outside party device 8.

After the communication channel is established, the first outside party device 3 and the second outside party device 8 are able to transmit data (e.g., messages) to each other through the first closed server 1 and the second closed server 6.

For example, in the case that the first outside party intends to transmit a message to the second outside party (referred to as a first-to-second message), in step S46, the first outside party device 3 compiles the first-to-second message to include the verification information and transmits the first-to-second message to the first closed server 1 in response to the first outside party inputting the first-to-second message using the first outside party device 3.

In response to receipt of the first-to-second message, in step S47, the first closed server 1 transmits the first-to-second message to the second closed server 6.

In turn, in step S48, the second closed server 6 determines whether the first-to-second message includes the verification information. When it is determined that the first-to-second message includes the verification information, in step S49, the second closed server 6 transmits the first-to-second message to the second outside party device 8. In some embodiments, the second closed server 6 is configured to transmit the first-to-second message to the second communication group 7.

Similarly, in the case that the second outside party intends to transmit a message to the first outside party (referred to as a second-to-first message), in step S50, the second outside party device 8 compiles the second-to-first message to include the verification information and transmits the second-to-first message to the second closed server 6 in response to the second outside party inputting the second-to-first message using the second outside party device 8.

In response to receipt of the second-to-first message, in step S51, the second closed server 6 transmits the second-to-first message to the first closed server 1.

In turn, in step S52, the first closed server 1 determines whether the second-to-first message includes the verification information. When it is determined that the second-to-first message includes the verification information, in step S53, the first closed server 1 transmits the second-to-first message to the first outside party device 3. In some embodiments, the first closed server 1 is configured to transmit the second-to-first message to the first communication group 2.

Figure 5:
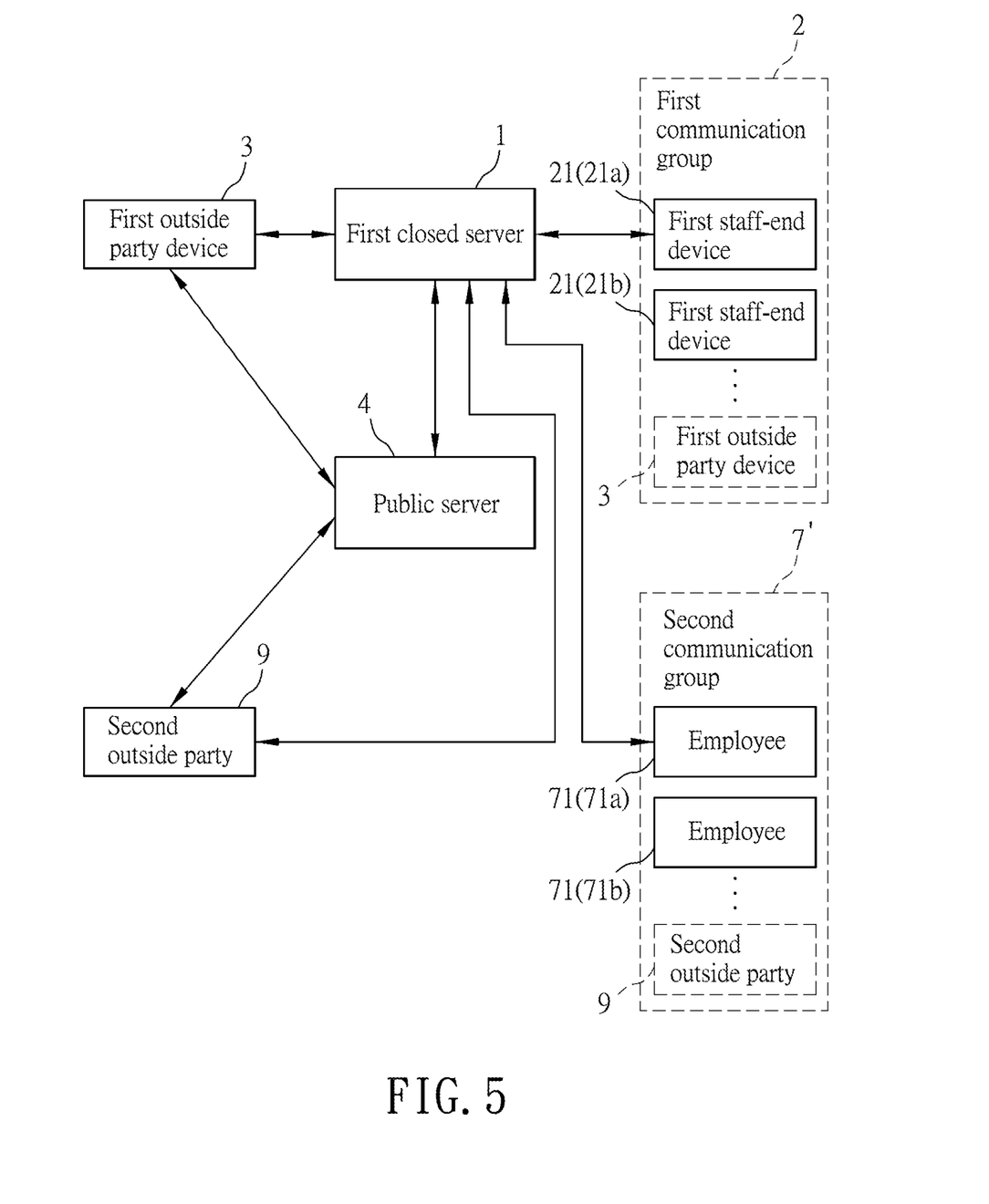
FIG. 5 is a block diagram illustrating two outside parties respectively added to two different communication groups associated with a single group of people according to one embodiment of the disclosure.

FIG. 5 is a block diagram illustrating another scenario, that involves two outside parties (e.g., the first outside party and a third outside party) who are respectively added to two different communication groups 2, 7' associated with a single group of people (e.g., the first group of people), according to one embodiment of the disclosure.

In this scenario, when it is desired that the first outside party and the third outside party communicate with each other, a method for establishing communication between the first outside party and the third outside party within a closed network may be carried out.

Figure 6:
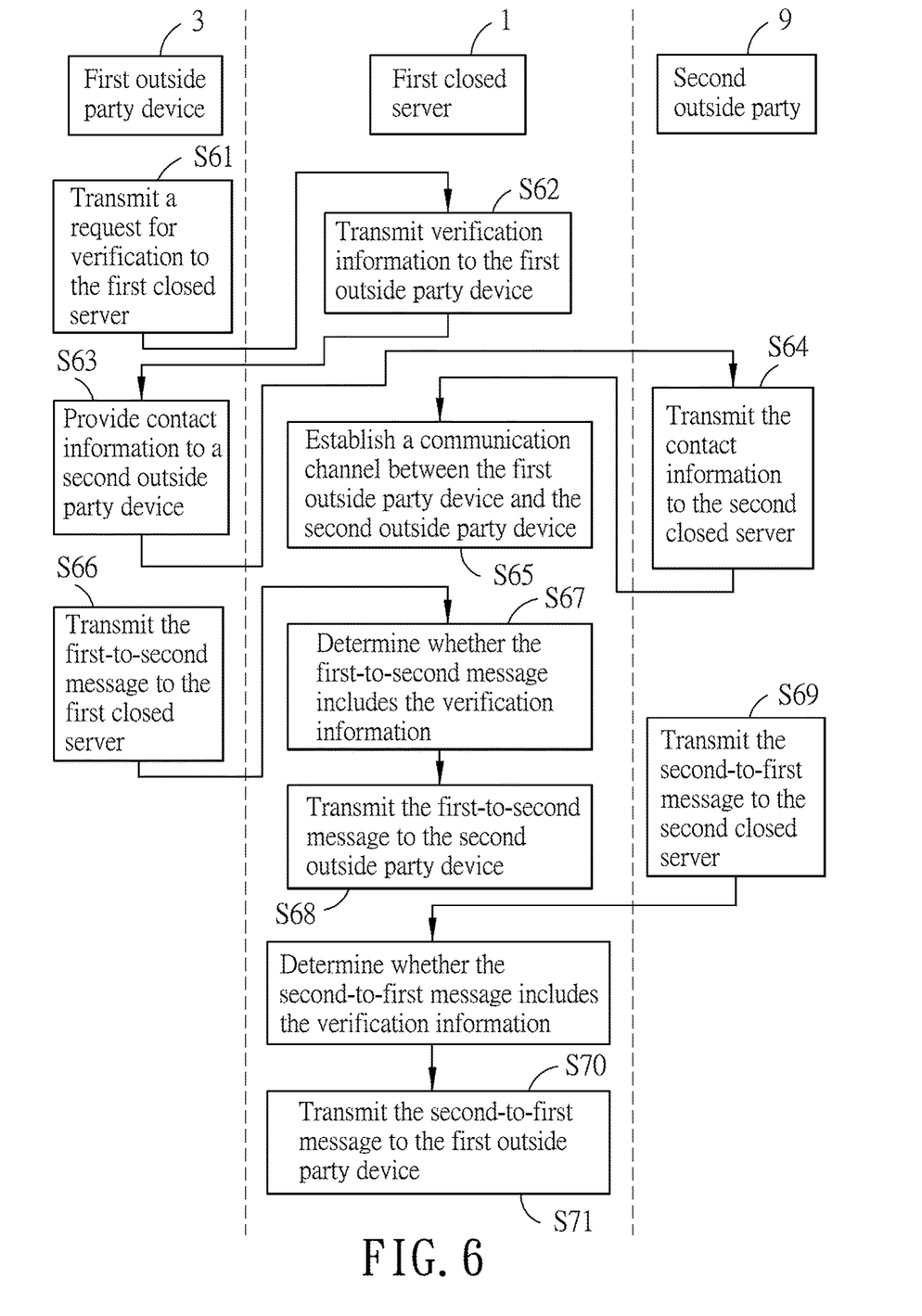
FIG. 6 is a flow chart illustrating a method for establishing communication within a closed network to be implemented using the first closed server cooperatively with the public server, according to one embodiment of the disclosure.

FIG. 6 is a flow chart illustrating the method for establishing communication within a closed network to be implemented using the first closed server 1, according to one embodiment of the disclosure.

In step S61, upon the first outside party operating the first outside party device 3, the first outside party device 3 transmits a request for verification to the first closed server 1. In response to receipt of the request for verification, in step S62, the first closed server 1 transmits verification information to the first outside party device 3.

In step S63, upon the first outside party operating the first outside party device 3, the first outside party device 3 provides contact information to a third outside party device 9 that is associated with the third outside party. The contact information may include the identification information and the verification information.

It is noted that in some embodiments, the contact information is encoded in a quick response (QR) code, is displayed by the display of the first outside party device 3, and is scanned by an image capturing component (e.g., a camera) included in the third outside party device 9. The third outside party device 9 may include a processor to decode the QR code scanned by the image capturing component so as to obtain the contact information encoded in the QR code.

Subsequently, in step S64, upon receiving the contact information, the second outside party device 8 stores the contact information and transmits the contact information to the first closed server 1.

In step S65, in response to receipt of the contact information, the first closed server 1 establishes a communication channel between the first outside party device 3 and the second outside party device 8 based on the contact information.

After the communication channel is established, the first outside party device 3 and the third outside party device 9 are able to transmit data (e.g., message) to each other through the first closed server 1.

For example, in the case that the first outside party intends to transmit a message to the third outside party (referred to as a first-to-third message), in step S66, the first outside party device 3 compiles the first-to-third message to include the verification information and transmits the first-to-third message to the first closed server 1 in response to the first outside party inputting the first-to-third message using the first outside party device 3.

In response to receipt of the first-to-third message, in step S67, the first closed server 1 determines whether the first-to-third message includes the verification information. When it is determined that the first-to-third message includes the verification information, in step S68, the first closed server 1 transmits the first-to-third message to the second outside party device 8.

Similarly, in the case that the third outside party intends to transmit a message to the first outside party (referred to as a third-to-first message), in step S69, the third outside party device 9 compiles the third-to-first message to include the verification information and transmits the third-to-first message to the first closed server 1 in response to the third outside party inputting the third-to-first message using the third outside party device 9.

In response to receipt of the third-to-first message, in step S70, the first closed server 1 determines whether the third-to-first message includes the verification information. When it is determined that the third-to-first message includes the verification information, in step S71, the first closed server 1 transmits the third-to-first message to the first outside party device 3.

To sum up, the above embodiments provide a method to allow one or more outside parties to have limited communication within a communication group of a group of people using the instant messaging service, which is closed within (generally exclusive to) the first group of people. This may achieve the effect of enhanced security since both the first closed server 1 and the public server 4 are involved in adding the outside party to the communication group, and the outside party is not enabled to communicate outside of the communication group. As a result, a specific inside party (e.g., a representative of an enterprise) may pre-establish the communication group that includes only himself/herself, such that the outside party is only enabled to communicate with the specific inside party.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for establishing communication within a closed network, the method being implemented using a first closed server cooperatively with a public server, the first closed server being in communication with the public server and being installed with a first instant messaging service system exclusive to a first group of people, the first instant messaging service system including a first communication group that includes at least one first inside party within the first group of people, the method comprising:

receiving, by the first closed server, identification information associated with a first outside party not belonging to the first group of people from a first staff-end device that is in communication with the first closed server and that is associated with the first inside party;

transmitting, by the first closed server, link information to a first outside party device that is associated with the first outside party via the public server, the link information including a link for downloading an instant messaging application;

in response to receipt of a registration request from the first outside party device executing the instant messaging application, transmitting, by the public server, an identifier associated with the first communication group to the first outside party device; and in response to receipt of the identifier from the first outside party device executing the instant messaging application, by the first closed server, adding the first outside party to the first communication group and enabling the first outside party to communicate exclusively with the first inside party via the first instant messaging service system.

2. The method of claim 1, wherein the identification information includes at least one of a telephone number or an email address associated with the first outside party.

3. The method of claim 1, further being implemented by a second closed server being in communication with the public server and being installed with a second instant messaging service system exclusive to a second group of people, the second instant messaging service system including a second communication group that includes at least a second inside party belonging to the second group of people and a second outside party not belonging to the second group of people, the method further comprising:

in response to receipt of a request for verification from the first outside party device executing the instant messaging application, transmitting, by the first closed server, verification information to the first outside party device;

in response to receipt of contact information from a second outside party device associated with the second outside party, establishing, by the second closed server, a communication channel between the first outside party device and the second outside party device according to the contact information, wherein the contact information includes the identification information, the verification information and connection information associated with the first closed server;

in response to receipt of a first-to-second message from the first outside party device through the first closed server, determining, by the second closed server, whether the first-to-second message includes the verification information;

when it is determined that the first-to-second message includes the verification information, transmitting, by the second closed server, the first-to-second message to the second outside party device;

in response to receipt of a second-to-first message from the second outside party device through the second closed server, determining, by the first closed server, whether the second-to-first message includes the verification information; and when it is determined that the second-to-first message includes the verification information, transmitting, by the first closed server, the second-to-first message to the first outside party device.

4. The method of claim 3, wherein the contact information is provided by the first outside party device to the second outside party device.

5. The method of claim 4, wherein the contact information is encoded in a quick response (QR) code, is displayed by the first outside party device, and is scanned by the second outside party device.

6. The method of claim 1, the first instant messaging service system further including a second communication group that includes at least one inside party belonging to the first group of people and a second outside party not belonging to the first group of people, the method further comprising:

in response to receipt of a request for verification from the first outside party device executing the instant messaging application, transmitting, by the first closed server, verification information to the first outside party device;

in response to receipt of contact information from a second outside party device associated with the second outside party, establishing, by the first closed server, a communication channel between the first outside party device and the second outside party device, wherein the contact information includes the identification information and the verification information;

in response to receipt of a first-to-second message from the first outside party device, determining, by the first closed server, whether the first-to-second message includes the verification information;

when it is determined that the first-to-second message includes the verification information, transmitting, by the first closed server, the first-to-second message to the second outside party device;

in response to receipt of a second-to-first message from the second outside party device, determining, by the first closed server, whether the second-to-first message includes the verification information; and when it is determined that the second-to-first message includes the verification information, transmitting, by the first closed server, the second-to-first message to the first outside party device.

7. The method of claim 6, wherein the contact information is provided by the first outside party device to the second outside party device.

8. The method of claim 7, wherein the contact information is encoded in the form of a quick response (QR) code, is displayed by the first outside party device, and is scanned by the second outside party device.

* * * * *